United States Patent
Kinchen, Sr.

(10) Patent No.: US 6,173,524 B1
(45) Date of Patent: Jan. 16, 2001

(54) FISHING LINE BOBBER

(76) Inventor: Kirby A. Kinchen, Sr., 2618 NE. 195th Apt. A1, Seattle, WA (US) 98155

(*) Notice: Under 35 U.S.C. 154(b), the term of this patent shall be extended for 0 days.

(21) Appl. No.: 09/328,030

(22) Filed: Jun. 8, 1999

(51) Int. Cl.$^7$ ..................................... A01K 91/00
(52) U.S. Cl. .................. 43/43.1; 43/42.31; 43/44.92; 43/44.95
(58) Field of Search ................ 43/44.92, 44.93, 43/44.94, 44.95, 43.1, 42.31

(56) References Cited

U.S. PATENT DOCUMENTS

| | | | |
|---|---|---|---|
| 1,374,943 | * | 4/1921 | Melvin . |
| 1,792,989 | * | 2/1931 | La Gue . |
| 2,181,458 | * | 11/1939 | La Gue . |
| 2,607,153 | * | 8/1952 | Lambach . |
| 2,772,504 | * | 12/1956 | Zerante . |
| 2,876,581 | * | 3/1959 | Schmidt . |
| 3,461,596 | * | 8/1969 | Green . |

FOREIGN PATENT DOCUMENTS

| | | | | |
|---|---|---|---|---|
| 1130880 | * | 10/1956 | (FR) | ................................. 43/44.92 |
| 771349 | * | 3/1957 | (GB) | ................................. 43/44.95 |
| 1251393 | * | 10/1971 | (GB) | ................................. 43/44.95 |

* cited by examiner

Primary Examiner—Jack W. Lavinder
(74) Attorney, Agent, or Firm—Delbert J. Barnard

(57) ABSTRACT

A buoyant body (10, 10') is connected to a fishing line (FL). The buoyant body (10, 10') includes an inner chamber (12) having a closed top (14) and a closed bottom (16). An elongated member (18) extends vertically through the inner chamber (18). Fish line receiving eyes (68, 70) are formed by the elongated member (18) at the upper and lower ends of the bobber (B). A movable mass (M) is provided within the inner chamber (12). During fishing, movement of the bobber (B) imparts movement to the mass (M) and movement of the mass (M) induces fish attracting vibrations into the fishing line (FL).

10 Claims, 3 Drawing Sheets

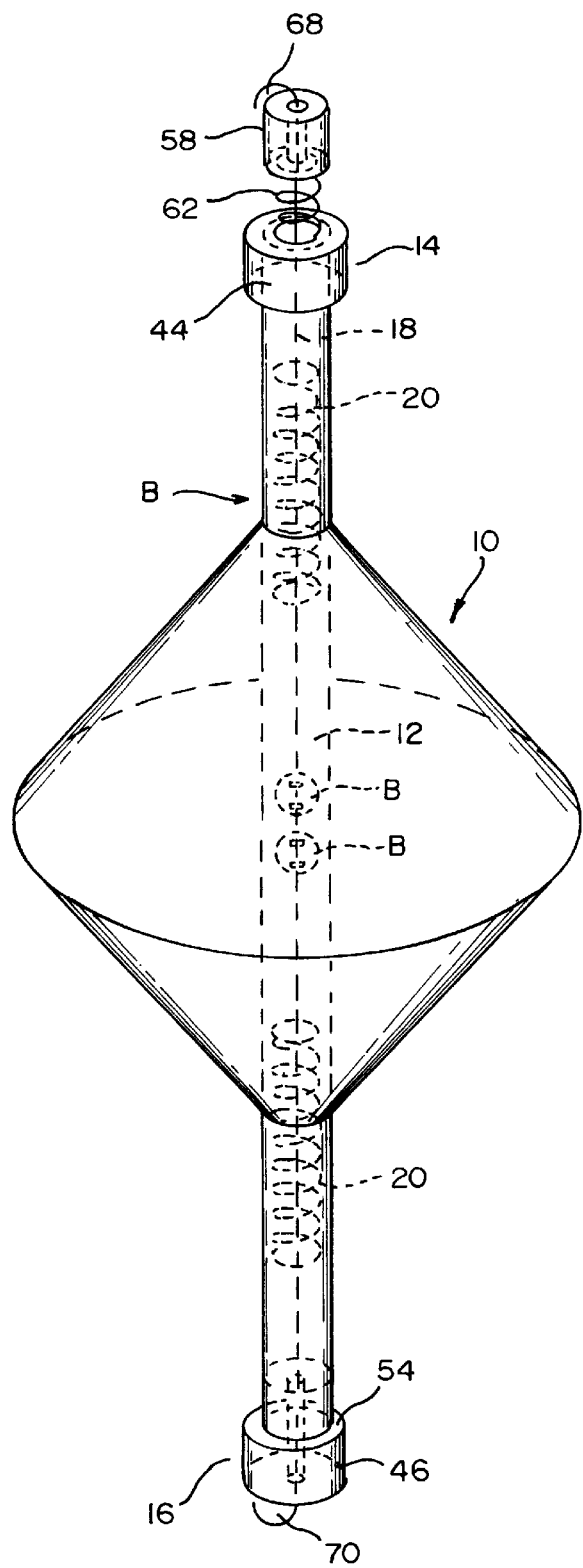
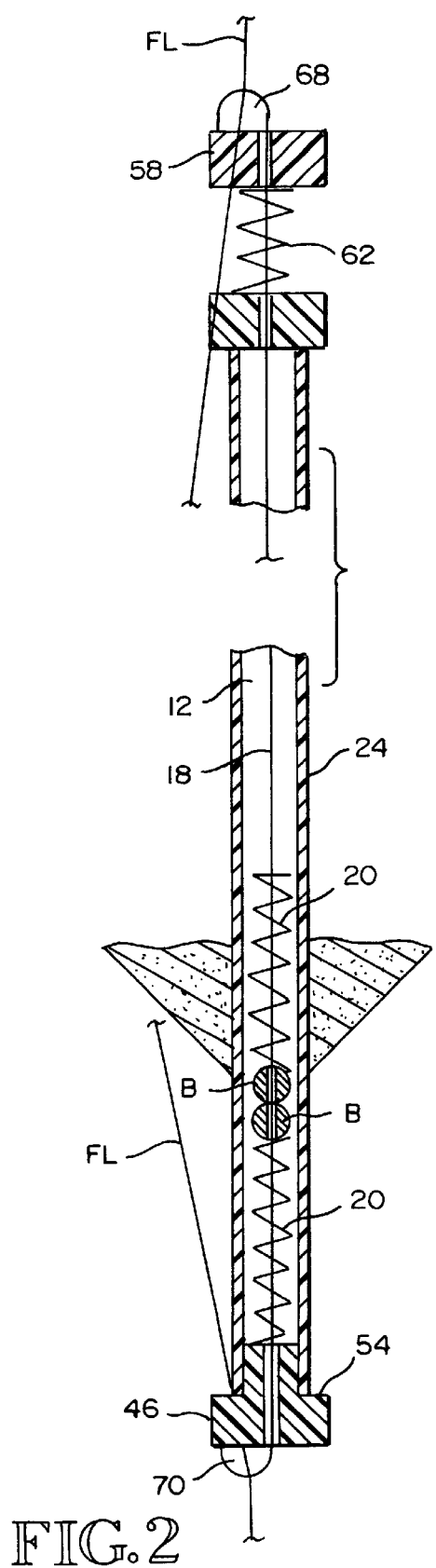
FIG. 1
FIG. 2

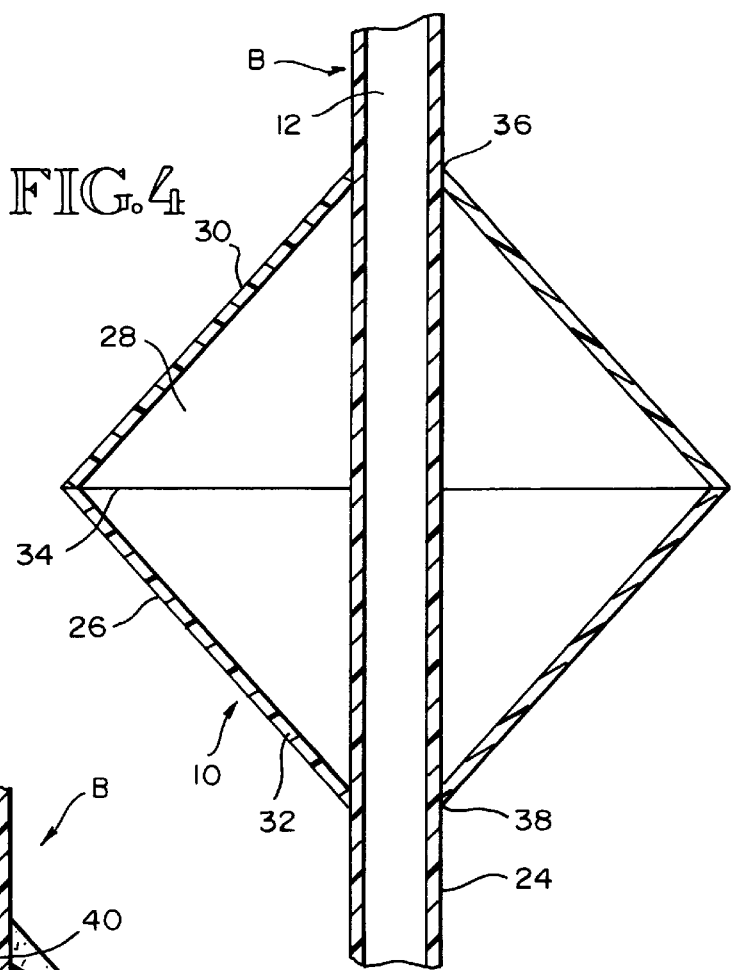
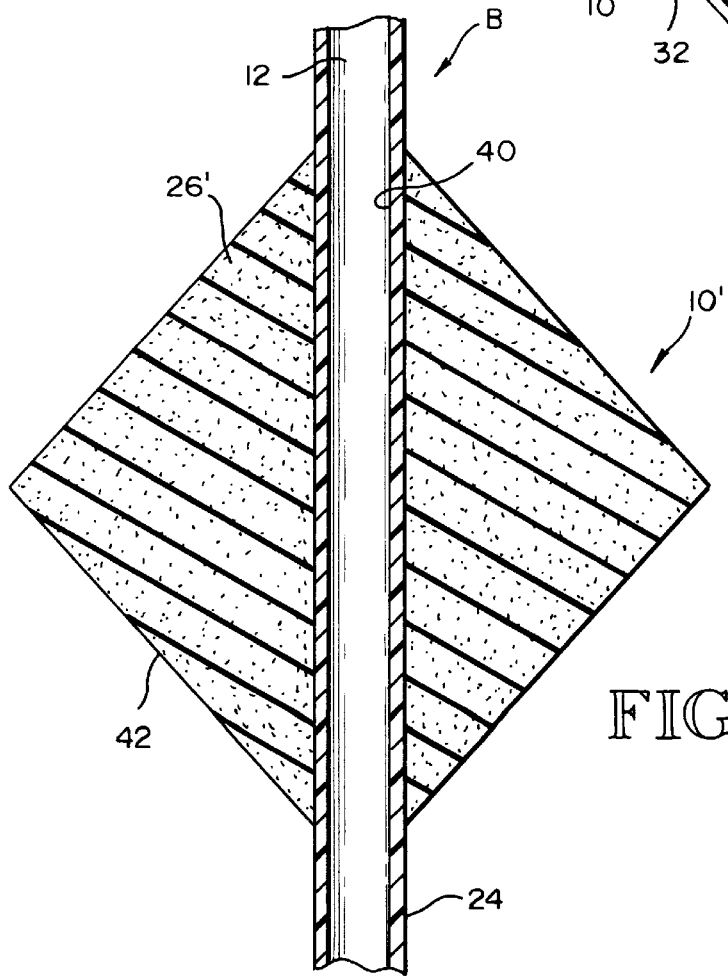

FISHING LINE BOBBER

TECHNICAL FIELD

This invention relates to fishing line bobbers. More particularly, it relates to the provision of fishing line bobbers that are adapted to induce fish attracting vibrations into the fishing line.

BACKGROUND OF THE INVENTION

As is well known, a "bobber" is a float that is attached to a fishing line. Its primary purpose is to establish the position of the baited hook or lure relative to the bottom. The bobber is secured to the line at a fixed distance from the hook or lure, a distance that is less than the distance between the water surface and the bottom. Another function of a bobber is to alert the fisherman that a fish is nibbling at the bait or lure. Tugs by the fish on the line causes the bobber to dip in the water. Upon release of a tug, the buoyancy of the bobber causes it to rise in the water. The up and down movement is termed a "bobbing" action, hence, the name "bobber."

A bobber is generally not considered to be a lure because it is positioned at the surface of the water a considerable distance above the baited hook or lure. However, an object of the present invention is to add a "fish attracting" or "luring" function to the bobber.

An object of the invention is to provide a fishing line bobber that is adapted to induce fish attracting vibrations into the fishing line to which the bobber is connected.

BRIEF SUMMARY OF THE INVENTION

A fishing line bobber of the present invention is basically characterized by a buoyant body that is adapted to be connected to a fishing line. The buoyant body includes an inner chamber having a closed top and a closed bottom. A movable mass is provided within the inner chamber. In use, movement of the bobber will impart movement to the mass and movement of the mass will induce fish attracting vibrations in the fishing line.

According to an aspect of the invention, the fishing line bobber includes an elongated member that extends vertically through the inner chamber. The elongated member is attached to the fishing line. The movable mass is supported on and by the elongated member, for sliding movement therealong. The elongated member may be a guide wire or rod that extends through the bobber and the inner chamber. The guide wire or rod is attached to the fishing line.

The movable mass may comprise at least one elongated helical spring, supported on and by the guide wire or rod, for sliding movement therealong. In preferred form, the movable mass comprises a pair of helical springs within the inner chamber, on the guide wire or rod, and positioned end-to-end. The mass may include one or more beads in the chamber and on the guide wire or rod, between the two helical springs.

In a preferred embodiment, the buoyant body comprises a buoyancy producing portion and a tubular member extending through the buoyancy producing portion. The tubular member is connected to the buoyancy producing portion. The buoyancy producing portion may be a three dimensional hollow structure. Or, it may be a substantially solid member formed of a buoyant material. The tubular member may be elongated and it may have an upper portion projecting upwardly from the buoyancy producing portion and a lower portion projecting downwardly from the buoyancy producing portion.

According to another aspect of the invention, a fishing line bobber is provided that comprises a buoyant body adapted to be connected to a fishing line. The buoyant body includes a buoyancy producing portion and a tubular portion extending through an upwardly and downwardly from the buoyancy producing portion. The buoyant body includes an inner chamber having a top end and a bottom end. A first closure member is provided at the top end of the tubular inner chamber, closing said end, and including a guide wire receiving passageway. A second closure member is provided at the bottom end of the tubular inner chamber, closing said bottom end, and also including a guide wire receiving passageway. A guide wire or rod extends through said bobber and said inner chamber. The guide wire also extends upwardly through the opening in the top closure and downwardly through the opening in the bottom closure. The guide wire is connected to the fishing line both above the top closure and below the bottom closure. This fishing line bobber includes a movable mass within the inner chamber, supported on and by said guide wire, for sliding movement therealong. Movement of the bobber will impart movement to the mass and movement of the mass will induce fish attracting vibrations into the fishing line to which the bobber is connected.

In preferred form, the fishing line bobber also comprises an anchor member positioned endwise from one of the closure members. The anchor member includes a guide wire or rod receiving opening. A compression spring is positioned between the anchor member and the adjacent closure member. The guide wire extends from the opposite end of the fishing line bobber, through the guide wire receiving passageway in the closure member at that end, then through the tubular inner chamber of the fishing line bobber, and through the mass in said chamber, then through the closure member at the opposite end of the tubular inner chamber, then through the compression spring and then through the anchor member. The guide wire has a first end portion pressing against the closure member at the first end of the fishing line bobber and a second end portion pressing against the anchor member at the other end of the fishing line bobber. The guide wire is of such a length that when its end portions are in contact with the closure member at the first end of the bobber and the anchor member at the second end of the bobber, the compression spring is compressed. This stores energy in the compression spring that biases the anchor member away from the adjacent closure member. This puts tension in the guide wire and holds the end portions of the guide wire into contact with the closure member at the first end and the anchor member at the second end. The fishing line is connected to the end portions of the guide wire that are endwise outwardly from the closure member at the first end of the bobber and the anchor at the other end of the bobber.

Other objects, advantages and features of the invention will become apparent from the drawings, from the description of the best mode set forth below, from the claims and from the principles that are embodied in the specific structures that are illustrated and described.

BRIEF DESCRIPTION OF THE SEVERAL VIEWS OF THE DRAWING

Like reference numerals and letters are used to designate like parts throughout the several views of the drawing, and:

FIG. 1 is a pictorial view of an embodiment of the invention, taken from above and looking downwardly and towards the front of the embodiment, such view showing the body parts as if they were transparent in order to show the inner chamber and the mass within the inner chamber, such view showing the mass composed of several parts and showing the several parts spaced apart;

FIG. 2 is a fragmentary longitudinal sectional view of the bobber, showing the same mass that is in FIG. 1, but showing the mass positioned by gravity into a lower position in the inner chamber, such view also showing a fishing line extending alongside the bobber and through eyes that are formed at the upper and lower ends of the bobber, by the end portions of the guide wire;

FIG. 4 is a fragmentary longitudinal sectional view of the buoyant body, showing a buoyancy producing portion that is hollow, surrounding a center tube; and FIG. 5 is a view like FIG. 4, but showing a buoyancy producing portion that is formed form a solid body of buoyant material.

DETAILED DESCRIPTION OF THE INVENTION

Figure 3:
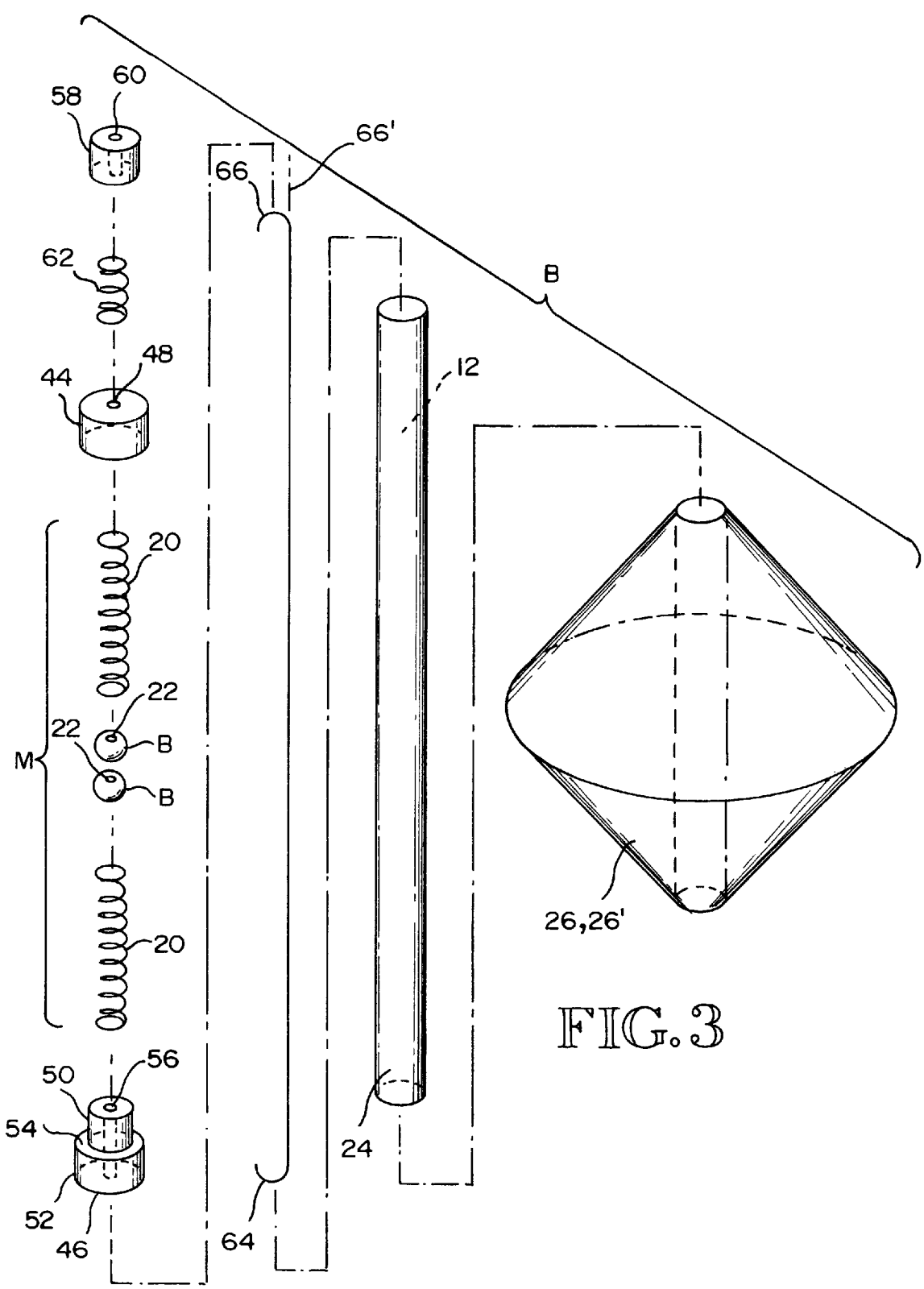
FIG. 3 is an exploded pictorial view of the embodiment shown by FIG. 1.

Referring to FIGS. 1 and 3, a fishing line bobber B is shown that comprises a buoyant body 10 that is adapted to be connected to a fishing line FL (FIG. 2). The buoyant body includes an inner chamber 12 having a closed top 14 and a closed bottom 16. An elongated member 18 extends vertically through the inner chamber 12 and is attached to the fishing line FL. A movable mass M is supported on and by the elongated member 18 for sliding movement therealong.

Preferably, the mass M includes at least one coil spring 20 through which the elongated member 18 extends. The preferred mass M includes a pair of helical springs 20, and a pair of beads B between them. Each bead B includes a center opening 22. As shown, the coils of each spring 20 form an elongated passageway extending lengthwise through the spring 20. This mass M will be described in more detail later in this description. The shape and construction of the buoyant body can vary considerably. For convenience in manufacture, the buoyant body 10 may comprise a tubular portion or tube 24 that extends through a buoyancy producing portion 26 or 26'. Buoyancy producing portion 26 is hollow and the inner space 28 provides the buoyancy. The sidewall material that forms the chamber 28 and the sidewall material that forms the tube 24 are themselves not buoyant. However, when they are connected together, the buoyant body 10 is in total buoyant. It will sink part way into the water until a lower portion of its volume has displaced an amount of water equal in weight to the total weight of the bobber 10. When this happens, an upper portion of the buoyancy producing portion 26 and the upper portion of the tube 24 will project upwardly above the surface of the water.

The buoyancy producing portion shown by FIG. 4 can be formed by upper and lower conical members 30, 32, each constructed from a suitable plastic material. Large diameter base portions of the conical members 30, 32 are glued or welded together where they meet at 34. The tube 24 extends through openings in the apex regions of the conical members 30, 32. The buoyancy producing portion 26 is secured to the tube 24 in any suitable manner, e.g. by glue, a cross pin, etc. The conical housing portions 30, 32 are welded or glued to the tube 24 at regions 36, 38. The sidewall material surrounding these openings is glued or welded to the tube 24. The resulting structure has a water tight interior chamber 24 that provides the buoyancy.

FIG. 5 shows a modified construction of the buoyant body 10'. In this embodiment, the buoyancy producing portions 26' is formed from a solid material that is itself buoyant. Examples are lightweight wood and foam plastics. FIG. 5 shows the center tube 24 extending through a center opening 40. In the embodiment of FIG. 5, the buoyancy producing portion and the tube 24 together provide the buoyant body. As is know per se, the buoyant material 26' may be covered by a protective sheath or layer 42. This layer 42 may be sprayed on the member 26', or may be painted on, or may be formed by dipping the member 26' in a body of the sheath forming material. The sheath forming material may be provided to prevent water from entering into the body 26' and/or it may be provide for giving the material 26' a tougher outer surface, for resisting wear.

In both of the illustrated embodiments, the inner chamber 12 is provided by the open interior or passageway in the tube 24. In other embodiments, the buoyancy producing portion 26, 26' can be formed to include a center opening that provides the inner chamber 12. In such an embodiment, the tube 24 would be omitted and the body portion 26, 26' would be elongated so as to give the bobber B additional height.

Referring now to FIG. 3, the bobber B is shown to include a first or upper closure member 44 for closing the upper end of the inner chamber 12 and a second closure member 46 for closing the lower end of the inner chamber 12. Upper closure member is shown in the form of a cylindrical solid that includes a center opening 48 at its geometrical center. The bottom closure member 46 has a cylindrical upper portion 50 and a cylindrical lower portion 52. The upper portion 50 is smaller in diameter than the lower portion 52, resulting in a shoulder 54 being formed where the upper portion 50 meets the lower portion 52. A center passageway 56 extends end-to-end through the closure 46 at its geometric center.

For reasons that are hereinafter described, it is desirable to construct the closure 46 in the manner shown and is permissible to construct the closure 44 in the manner shown. However, closure 44 could be constructed to be identical to closure 46.

A member 58 that is herein referred to as an "anchor" member 58 is provided to be positioned above the closure member 44 or below closure member 46. In the illustrated embodiment, it is above the closure 44. Anchor member 58 is solid and may be cylindrical in shape. It includes a center opening 60 at its geometric center. A compression spring 62 is provided to be positioned at the closure member and the anchor member 58. As shown, the coils of spring 62 form an elongated passageway that extends longitudinally through the spring 62.

In FIG. 3, the tube 24 is shown separate from the buoyancy producing portion 26, 26'. As earlier described, the tube 24 extends vertically through the portion 26, 26' and the parts are connected together in any suitable manner. In FIG. 3, the elongated member 18 is shown in the form of an elongated wire or rod having upper and lower end portions 58, 60 that are bent into a generally semicircular shape. However, before assembly, one of the end portions 58, 70 is straight. This is done to facilitate assembly of the components of the bobber B. Let it be assumed that tube 24 is within buoyancy producing portion 26, 26', and tube 24 is connected to buoyancy producing portion 26, 26'. Let it also be assumed that the upper end portion 58 of the guide member 18 is initially straight. The components are assembled as follow: The straight upper end portion 58 of guide member 18 is inserted upwardly through opening 56 in closure 46, then through the passageway in the lower spring 20, then through the passageway 22 in the lower bead B, then through the passageway 22 in the upper bead B, and then through the passageway in the upper spring 20. Next this stack of elements on guide member 18 is moved upwardly through the inner chamber 12 in tube 24. It is moved upwardly until the upper portion 50 of lower closure member 46 is within the lower end portion of the tube 24 and the lower end of the tube 24 is on shoulder 54. At that time, the straight upper end portion 58 of the guide member 18 projects upwardly from the open top of the inner chamber 12. Next, the upper closure 44 is inserted onto the guide member 18. That is, the straight upper end portion 58 of the guide member 18 is moved relatively through the center opening in the upper closure 44. Then, the straight upper end portion 58 of member 18 is moved through the longitudinal center of spring 62. Lastly, the straight upper end portion 58 of guide member 18 is moved through passageway 60 in anchor member 58. Then, assembly is complete in the following manner. The lower closure member 46 is held while the anchor member 58 is moved downwardly against spring 62, so as to compress spring 62 between anchor member 58 and upper closure member 44. Then, a pair of needle nose pliers, or the like, is used to grip the end portion of 58 and bend it into the semicircular hook shape that is illustrated. When the bending of end portion 58 is completed, the end portion 58 will bear against the anchor member 58. At the same time, spring 62 will be compressed. It will possess spring energy that acts downwardly on the top of closure member 44 and upwardly on the anchor member 58. Anchor member 58 wants to move upwardly but is prevented by the upper end portion 68 of the guide member 18. An upward force is exerted on the end portion 66 and, hence, on the guide member 18 as a whole. This force moves the lower end portion 64 of guide member 18 up into tight engagement with the lower closure member 46. As best shown in FIG. 2, when the bobber is assembled, fish line receiving eyes 68, 70 are formed at the upper and lower ends of the bobber B.

The bobber B can be attached to a fish line FL in the following manner. Firstly, one end of the bobber B is held and the other end is moved towards it, so as to compress spring 62 and open the eye that is adjacent the end member that is being moved. For example, anchor member 58 can be held and an endwise force can be applied to closure member 46, to open up the eye 70. When eye 70 is opened, the fish line FL is set into it. Then, in closure 46 is held while anchor member 58 is depressed. This opens eye 68 and lets the fishing line FL be placed in it. After the endwise force is removed, the fishing line FL extends through both eyes 68, 70. It extends along side the bobber B between the eyes 68, 70. It extends upwardly from eye 68 and downwardly from eye 70. When fishing line FL is being inserted in eye 68, it may be wrapped one or more times around the end portion 66 of guide member 18, so as to retard sliding movement of the fishing line FL through the bobber B. In this manner, the bobber B can be connected to the fishing line FL.

Referring to FIG. 2, the lower end of the lower helical spring 20 rests on the upper end of lower closure member 46. The beads B are larger in diameter than the center passageways in the springs 20. Thus, the lower bead B will sit down on the upper end of the lower spring 20, but will not enter into the passageway in the lower spring 20. The upper bead B will sit down on the lower bead B and will not enter into the passageway in the upper spring 20. The beads B may function as bearings, between the upper spring and said bead assembly 20, B and the lower spring and bead assembly 20, B. And/or, the beads B may function as weights. Movement of the beads may cause one or both of the springs 20 to compress. This is followed by expansion of the spring or springs 20. As clearly shown by FIGS. 1 and 2, the mass M in the illustrated embodiment is shorter in total length than the length of the inner chamber 12. As a result, the mass M can move up and down in the chamber 12. At times the various parts 20, B, B, 20 of the mass M may move together. At other times the parts 20, B, B, 20 may move relative to each other.

After the fishing line has been cast or set into the water in some other manner, the bobber B assumes a position in the water near the surface of the water. It floats in the water with its lower portion projecting down into the water and its upper portion projecting upwardly above the surface of the water. It is connected to the fishing line FL. The fishing line FL extends downward from the bobber B to a baited hook or lure (not shown) at the lower end of the fishing line FL. The buoyancy of the bobber B, and the fact that the fishing line FL is connected to the bobber B, holds the baited hook or lure at a particular position above the bottom of the lake bed, stream bed, etc. While floating, the bobber B is subjected to wave action, current movement, etc. which causes the bobber B to move up and down and sideways. This movement is imparted to the mass M, causing the mass M to move. Movement of the mass M induces fish attracting vibrations into the fishing line FL. These vibrations are sensed by the fish, bringing the fish's attention to the baited hook or lure at the lower end of the fishing line L.

Preferably, the parts of the bobber B, B' are made from plastic materials. However, it is possible to make the buoyancy producing member 26' from a light weight wood material. The guide member 18 is a narrow rod and it may be fashioned from a piece of wire. However, the important feature of member 18 is that it is long, thin, strong and can be bent to form the hooked end portions 64, 66. The springs 20 and beads B are inexpensive components for forming the mass M. However, it is believed that the construction of the mass M can be varied considerably. What is important is that the mass M will be caused to move by movement of the bobber and will impart movement into the fishing line.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A fishing line bobber, comprising:

a buoyant body adapted to be connected to a fishing line, said buoyant body including an inner chamber having a closed top and a closed bottom;

a movable mass within said inner chamber;

a guide wire extending through said bobber and said inner chamber, said guide wire being attached to the fishing line, and said helical spring being supported on and by said guide wire, wherein said movable mass comprises first and second helical springs within said inner chamber, supported on by the guide wire for sliding movement therealong; and positioned endwise of each other, whereby movement of the bobber will impart movement to the mass and movement of the mass will induce fish attracting vibrations into a fishing line to which the bobber is connected.

2. The fishing line bobber of claim 1, comprising at least one bead in said chamber, between the two helical springs, said bead having an opening in it through which the guide wire extends.

3. The fishing line bobber of claim 2, comprising at least two beads within the chamber, each having an opening through which the guide wire extends, both said beads being positioned between the two helical springs.

4. The fishing line bobber of claim 1, wherein said buoyant body comprises a buoyancy producing portion and a tubular member extending through the buoyancy producing portion and connected to it.

5. The fishing line bobber of claim 4, wherein the buoyancy producing portion is a three dimensional hollow structure.

6. The fishing line bobber of claim 4, wherein the buoyancy producing portion is a substantially solid member formed of a buoyant material.

7. The fishing line bobber of claim 4, wherein the tubular member is elongated and it has an upper portion projecting upwardly from the buoyancy producing portion and a lower portion projecting downwardly from the buoyancy producing portion.

8. The fishing line bobber of claim 7, comprising a guide wire extending through said bobber and said inner chamber, said guide wire being attached to the fishing line, and said movable mass being supported on and by said guide wire, for sliding movement therealong.

9. A fishing line bobber, comprising:

a buoyant body adapted to be connected to a fishing line, said buoyant body including a buoyancy producing portion and a tubular portion extending through and upwardly and downwardly from the buoyancy producing portion, said buoyant body including an inner chamber having a top end and a bottom end;

a first closure member at the top end of the tubular inner chamber, closing said end, and including a guide wire receiving passageway;

a second closure member at the bottom end of the tubular inner chamber, closing said bottom end, and including a guide wire receiving passageway;

a guide wire extending through said bobber and said inner chamber, said guide wire extending upwardly through the opening in the top closure and downwardly through the opening in the bottom closure, and being connected to the fishing line both above the top closure and below the bottom closure; and a movable mass within the inner chamber, supported on and by said guide wire, for sliding movement therealong, whereby movement of the bobber will impart movement to the mass and movement of the mass will induce fish attracting vibrations into a fishing line to which the bobber is connected;

said bobber further comprising;

an anchor member positioned endwise from one of the closure members, said anchor member including a guide wire receiving opening, and a compression spring positioned between said anchor member and said closure member, wherein said guide wire extends from the opposite end of the fishing line bobber through the guide wire receiving passageway in the closure member at that end, then through the tubular inner chamber of the fishing line bobber, then through the closure member at the opposite end, then through the compression spring and then through the anchor member, and wherein said guide wire has a first end portion pressing against the closure member at the first end of the fishing line bobber and a second end portion pressing against the anchor member at the other end of the fishing line bobber, said guide wire being of such a length that when its end portions are in contact with the closure member at the first end of the bobber and the anchor member at the second end of the bobber, the compression spring is compressed; and wherein the fishing line is connected to end portions of the guide wire that are endwise outwardly from the closure member at the first end of the bobber and the anchor member at the other end of the bobber.

10. The fishing line bobber of claim 9, wherein the movable mass comprises a helical spring within the inner chamber of the bobber through which the guide wire extends.

* * * * *